H. S. JEWELL, DEC'D.
L. JEWELL, EXECUTRIX.
PURIFYING MIDDLINGS AND OTHER MATERIAL.
APPLICATION FILED MAR. 5, 1921.
1,400,165.
Patented Dec. 13, 1921.
3 SHEETS—SHEET 3.
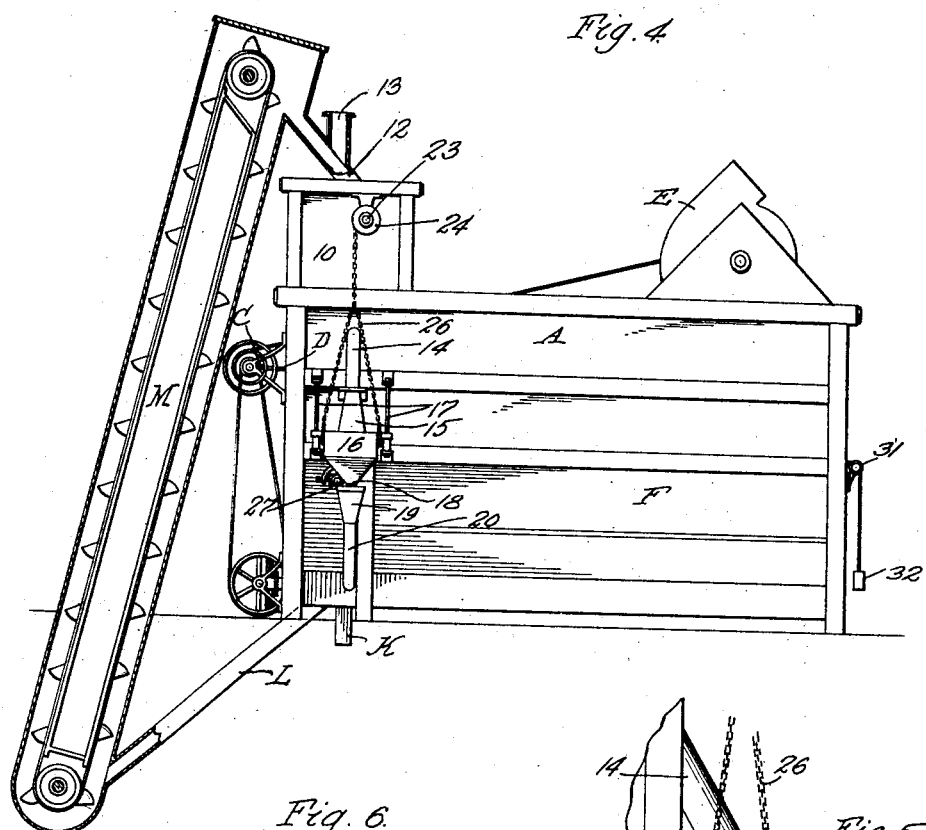
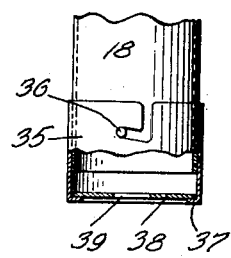
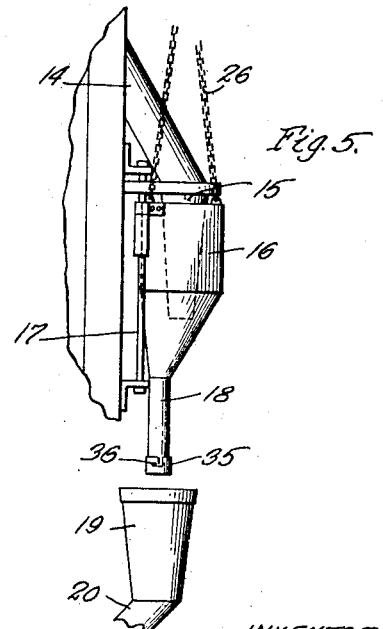

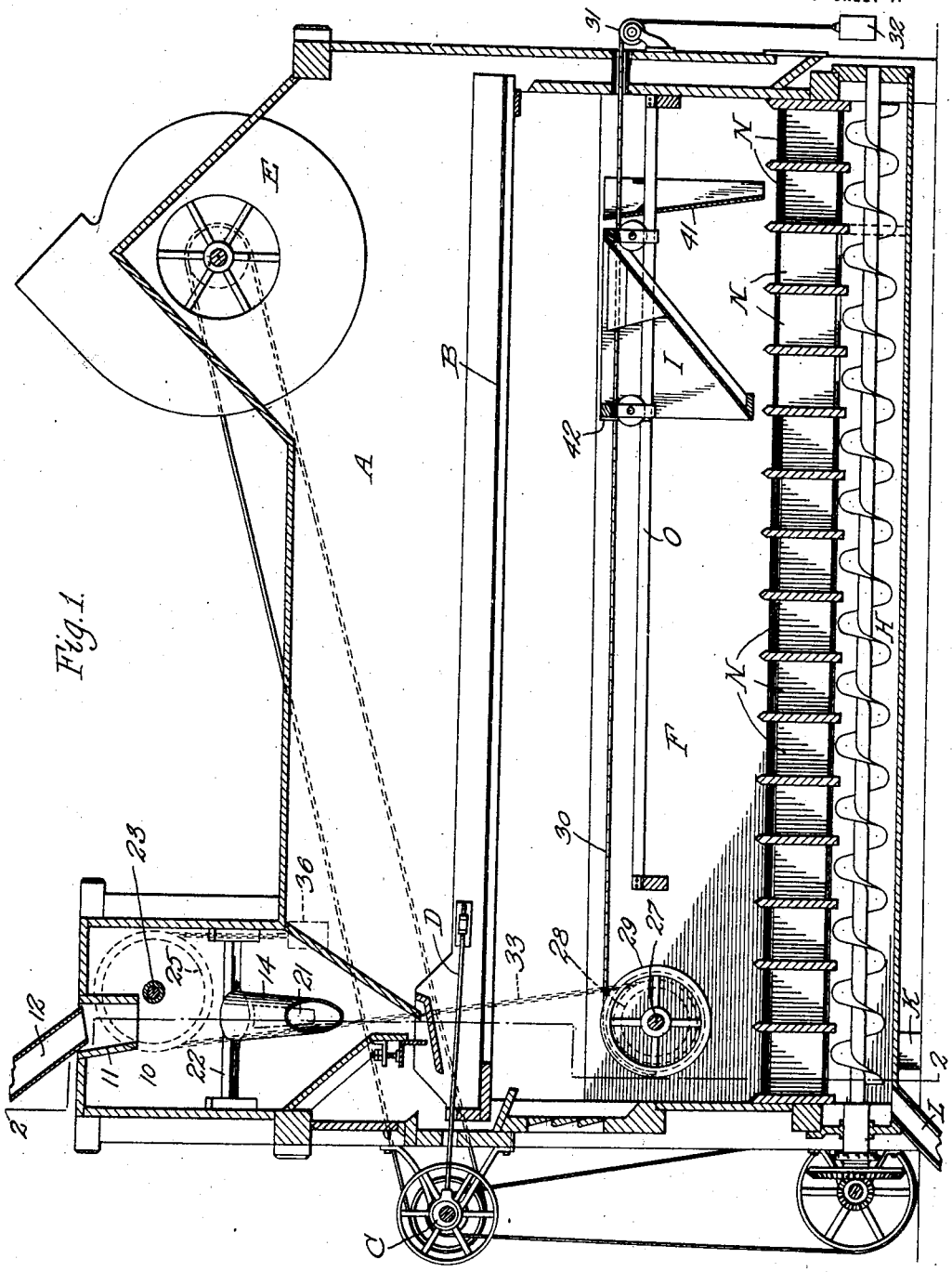

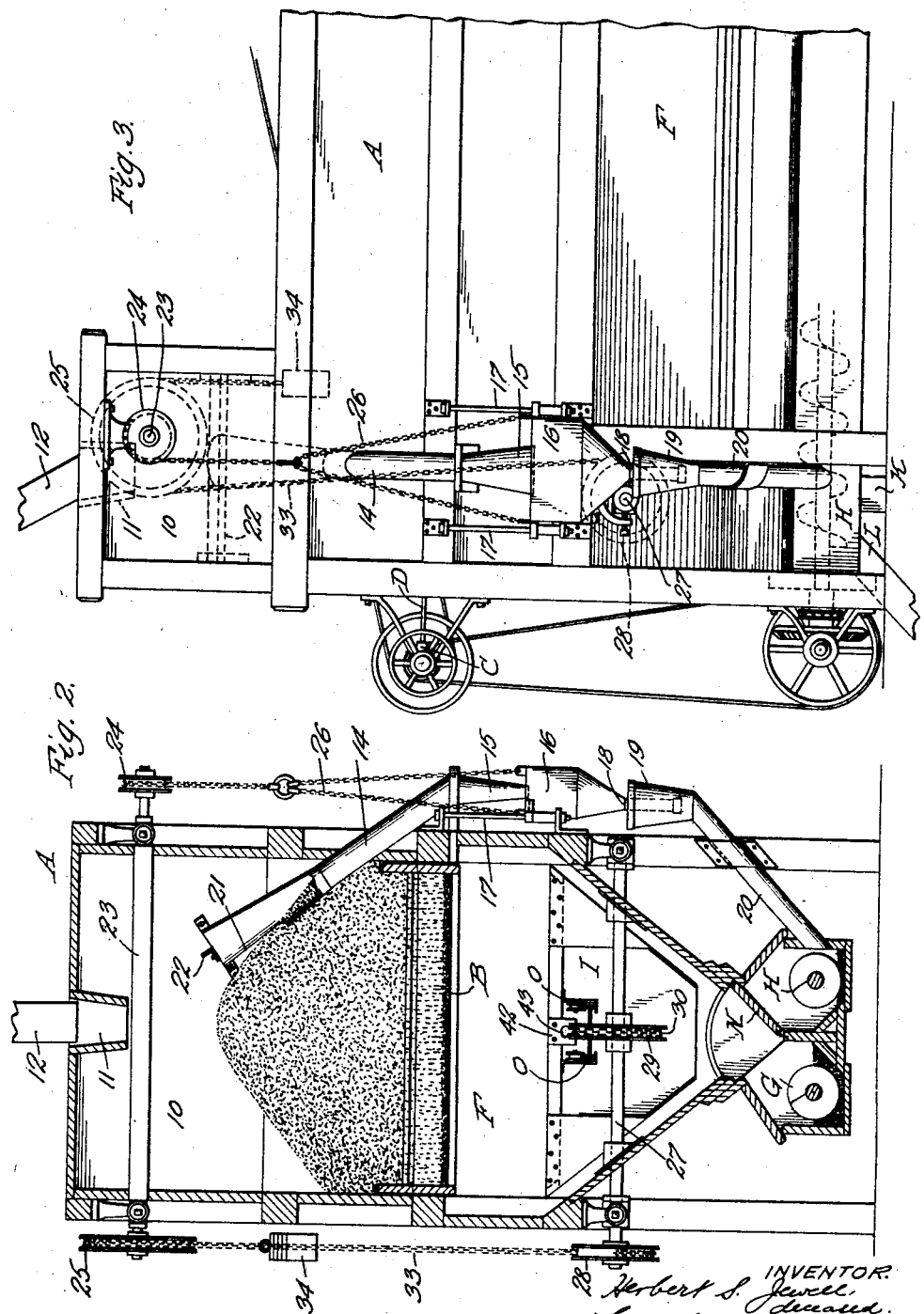

UNITED STATES PATENT OFFICE.

HERBERT S. JEWELL, DECEASED, LATE OF BROOKLYN, NEW YORK, BY LIDA JEWELL, EXECUTRIX, OF BROOKLYN, NEW YORK.

PURIFYING MIDDLINGS AND OTHER MATERIAL.

1,400,165.  Specification of Letters Patent.  Patented Dec. 13, 1921.

Application filed March 5, 1921. Serial No. 450,018.

*To all whom it may concern:*

Be it known that HERBERT S. JEWELL, deceased, late a citizen of the United States, residing at Brooklyn, in the county of Kings and State of New York, invented a new and useful Improvement in Purifying Middlings and other Material, of which the following is a specification.

This invention relates to that class of purifying or separating operation and apparatus in which the material to be purified or separated is caused to flow over a sieve on which the purification or separation is effected and an air current is used to carry off the light material.

In purifying middlings and other grain products, it is desirable that a uniform load or layer of material of uniform depth be maintained on the sieve for the reason that when the layer is not of even thickness the air current, which flows upwardly through the sieve and carries off the light impurities, passes most readily through the thin portions of the layer of material and acts less upon the thicker portions.

In order to maintain a layer of material of uniform thickness on the sieve, it is necessary to provide a uniform feed of material to the sieve. The feed of fresh material varies more or less from time to time but the feed of material to the sieve may be kept uniform and constant by augmenting the feed as it falls below the normal quantity necessary to such uniformity. In the apparatus disclosed in my Letters Patent No. 934,668, granted Sept. 21, 1909, the desired uniformity is maintained by returning automatically to the feed of fresh material such a portion of the purified or separated material as may be necessary to compensate for any deficiency in feed of fresh material, the quantity of purified material so returned being increased or decreased automatically accordingly as the feed of fresh material decreases or increases and the aggregate of the fresh material and the returned material being automatically maintained at a predetermined constant quantity for furnishing a uniform load or layer of desired thickness. In said patented apparatus, the fresh material is fed into a movable feed receptacle located above the feed hopper and sufficient of the purified material to maintain a uniform feed is returned to the feed receptacle, the quantity of returned material being varied in proportion to the weight of the material in the movable feed receptacle.

The objects of the present invention are to improve purifying operations of the character above set forth by providing for variable automatic control of the amount of purified material returned to augment the feed in proportion to the quantity of material in the feed hopper; also to utilize excess material from the feed hopper for effecting the automatic control of the amount of purified material returned to the feed hopper; also to provide a more compact apparatus which will occupy a minimum of space in the milling room, and particularly less vertical space; also to provide improved apparatus which is relatively inexpensive and consists of few parts. Further objects are to improve the efficiency of this class of operations and to provide improvements in the other respects hereinafter described and set forth in the claims.

In the accompanying drawings:—

Figure 1 is a sectional elevation of a portion of a middlings purifier embodying this invention.

Fig. 2 is a section thereof on line 2—2, Fig. 1.

Fig. 3 is a fragmentary side elevation thereof.

Fig. 4 is a side elevation on a reduced scale of a complete apparatus constructed according to the invention.

Fig. 5 is a fragmentary elevation on an enlarged scale of a portion of the purifier and the improved control means.

Fig. 6 is an enlarged sectional elevation of a portion of the control means shown in Fig. 5.

A designates generally a middlings purifier which is provided with a usual shaking sieve B operated by an eccentric C and rod D. E designates a fan and F a receiving hopper arranged lengthwise beneath the sieve. G and H are conveyers for the purified middlings and the return stream middlings respectively, arranged beneath and adapted to receive material from the receiving hopper F, and I is a pan or cut-off which is movable lengthwise beneath the sieve for permitting more or less of the purified material discharging into the receiving hopper to pass into the return conveyer. K designates a spout for discharging purified middlings from the conveyer G, and L a return feed spout connecting the conveyer H with an elevator M for returning a portion of the purified middlings to the feed to augment the same. N represents gates or deflectors for directing material falling from the sieve to the respective conveyers. These deflectors are pivoted so that they may be swung to deflect the material into either one of the conveyers as desired. In Fig. 1 of the drawings, the two rearmost deflectors are positioned so as to direct material falling thereon into a cut-off or partitioned portion of the purified middlings conveyer G, usually provided to receive the tailings passing through the rearmost portion of the screen. The next three deflectors are positioned to direct material into the return conveyer H and the remaining deflectors are positioned to close the openings to the return conveyer and direct material to the purified middlings conveyer. The deflectors may be turned to their different positions as desired to permit a lesser or greater amount of material to pass to the respective conveyers. O designates a pair of rails on which the pan I is movable longitudinally of the apparatus to permit a greater or less amount of material to pass to the return conveyer. In the position of the parts shown in Fig. 1, the movable pan I deflects any material tending to pass to the return conveyer, forwardly to the deflectors which are positioned to direct the material to the purified middlings conveyer. As the pan I is moved forwardly from the position shown in Fig. 1, a portion of the purified material will fall behind the pan I and pass into the return conveyer, the proportion of material passing therein depending upon the number of deflectors positioned to direct material into the return conveyer and the relative position of the movable pan I. These parts are of known construction and are fully described in the patent referred to.

According to the present invention, a feed hopper 10 having an inlet 11 is provided. This hopper is larger in size than the feed hoppers usually installed heretofore in apparatus of this kind, being of sufficient size to contain a quantity of material in excess of the normal requirement for a uniform load, and it may be made as a unit in such larger size, or provided by mounting a supplementary hopper chamber above a feed hopper of the size commonly in use heretofore. The elevator M discharges a return stream of purified middlings to the feed hopper inlet 11 through a spout 12, the feed of fresh material being admitted through a feed inlet 13. Automatic shifting of the movable pan I is effected and controlled by the quantity of material in the feed hopper 10 and to effect such control the excess material in the feed hopper, over and above the quantity required for a uniform load, is utilized. When the feed hopper contains a sufficient quantity of material to insure a load of the desired uniform thickness on the sieve, the pan I is in a position wherein it prevents purified material which has passed through the sieve from entering the return conveyer and directs or diverts all of such material to the conveyer G for the purified material (as indicated in Fig. 1) and as the quantity of material in the feed hopper decreases until such quantity is less than the minimum necessary for the required uniform load, the automatic pan is moved more or less to uncover the deflectors N which are set to direct material into the return conveyer, whereupon the material in the feed hopper is augmented by the return of a portion of the purified material. This automatic shifting of the pan I is preferably accomplished by providing the feed hopper with a by-pass tube or duct 14 preferably extending at an inclination up into the hopper through the outer wall and terminating at its outer end in a vertical tapered portion 15. A movable governor receptacle 16, preferably mounted to slide vertically on a pair of guide rods 17 suitably secured on the outside of the casing, is arranged to receive material discharging from the by-pass tube 14 and is preferably formed with an elongated discharge spout 18 arranged to discharge into the mouth 19 of a pipe 20 which communicates with the return conveyer H, whereby a portion of material may pass from the feed hopper through the governor and into the return conveyer. The governor is preferably open at its upper end, which end surrounds the lower end of the by-pass tube. The portion of the by-pass tube or duct 14 in the feed hopper is provided preferably in its under side with an opening 21 which is at such an elevation within the hopper as to permit material to enter the tube after a sufficient quantity of material accumulates in the hopper to maintain the required load on the sieve and whereby any excess over this required quantity is adapted to discharge through the by-pass. The by-pass tube can be supported in any suitable way, for instance by securing its upper end to a stationary cross bar 22 in the feed hopper.

23 designates a shaft which carries pulleys 24 and 25. Chains or straps 26 connect the governor receptacle 16 with the pulley 24 whereby a downward movement of the governor will turn the shaft 23. 27 designates a shaft which extends transversely through the purifier, and bears at its outer end a pulley 28 and within the purifier a pulley 29, to which is fixed one end of a chain 30 attached to the movable pan I. The other end of this chain passes out of the casing over a pulley 31 and is provided with a suitable counterweight 32. A chain or strap 33 is fixed at one end to the pulley 28, the other end of the chain passing over the pulley 25 and carrying a suitable counterweight 34. The counterweight 32 constantly tends to maintain the movable pan I in its rearmost position in which it prevents the purified material from passing into the return conveyer while the counterweight 34 constantly tends to move the pan forward and to overcome the counterweight 32. The counterweight 34 is preferably of sufficient weight to maintain the governor receptacle 16 in its upper position and the movable pan I in a forward position when the governor is empty. As material is passed into and accumulates in the governor the weight of the loaded governor will cause it to lower, turning the shafts 23 and 27 and permitting the counterweight 32 to move the pan I toward the rear of the apparatus.

Movement of the pan I may be controlled by regulating the rate of discharge from the governor. This may be done by changing the size of the discharge opening of the governor spout 18. In the preferred construction for this purpose, illustrated in Fig. 6, the governor spout is provided with a sleeve or nozzle 35 which is removably secured on the spout by a bayonet joint 36. The nozzle has an inturned end flange 37 which forms a seat for a removable disk 38 which is provided with an outlet aperture 39. A plurality of these removable disks having outlet apertures of different sizes are provided, thus permitting regulation of the discharge of material from the governor spout by changing the disks. 41 designates a tail partition fixed adjacent the rear end of the purifier and serving to direct any material falling therebehind to the rearmost deflectors where it is directed into a cut-off or partitioned portion of the purified middlings conveyer from whence it is passed out of the apparatus, as well known in the art, thus preventing any material passing through the tail cloth of the apparatus from being carried forward into the return or purified middlings conveyer streams.

The longitudinally movable pan I is preferably detachably connected to the chain 30 so that it may be readily positioned at different points thereon. This is preferably accomplished by providing the movable receptacle with an attaching part 42 having an open ended keyhole slot 43 therein. Thus when the chain is in its normal position it is wedged in the narrow portion of the slot; it may be released by forcing it upwardly into the enlarged portion of the slot, whereupon the pan I may be freely moved relatively to the chain until the desired position is reached, whereupon the chain may be wedged into the narrow portion of the slot to secure the parts together.

By reason of the fact that the material discharges from the governor more slowly than it enters, due to the relatively small discharge opening of the governor, excess material in the feed hopper passing into the governor accumulates therein and by its weight forces the governor down, moving the pan I, and thus cutting off or reducing the amount of material permitted to pass into the return conveyer. When the amount of material in the feed hopper falls to the minimum required to maintain a layer of material of required thickness on the sieve, as the material is discharged from the governor and its weight lessened, it rises, moving the deflector to permit material to fall from the sieve into the return conveyer, and thus increasing or decreasing the amount of material returned to the feed hopper maintains the proper amount of material in the feed hopper at all times.

The method and apparatus of this invention are particularly applicable to double purifiers and can be applied and practised with much less difficulty and expense than by other methods and apparatus heretofore in vogue. The apparatus used with the method of the present invention is particularly advantageous in that the vertical enlargement of the feed hopper may be of any desired height and the feed and return stream may be directed into the feed hopper through the sides thereof, if conditions in a mill are unusually cramped. By the elimination of the large feed receptacle vertically movable above the feed hopper, the improved apparatus occupies considerably less vertical space in the mill room.

I claim as my invention:—

1. In a separating machine, the combination with separating mechanism, a stationary feed hopper for said mechanism, discharge means for a portion of the separated material, and means for returning a portion of the separated material to the feed hopper, of means controlled by the quantity of material in said stationary feed hopper for varying the amount of material returned to the feed hopper by said return means.

2. In a separating machine, the combination with separating mechanism, a stationary feed hopper adapted to contain in excess of a sufficient amount of material to supply a uniform load of material to said separating mechanism, means for discharging separated material, and means for returning a portion of said separated material to said stationary feed hopper, of means controlled by the excess material in said feed hopper for varying the amount of separated material passing respectively to said discharging and said returning means.

3. In a separating machine, the combination with a separating sieve, a feed hopper adapted to supply a predetermined load of material to said sieve and to contain an amount of material in excess of such requirement, discharge means for discharging separated material from the machine, a return conveyer for returning a portion of the separated material to the feed hopper, and means controlled by the material in said hopper in excess of said load requirement for varying the amount of material permitted to pass to said return conveyer.

4. In a separating machine, the combination with a separating sieve, a stationary feed hopper adapted to supply a predetermined load of material to said sieve and to contain an amount of material in excess of such requirement, discharge means for discharging separated material from the machine, a return conveyer for returning a portion of the separated material to the feed hopper, a device movable beneath said sieve to vary the amount of separated material passing respectively to said discharge means and said return conveyer, and means controlled by the material in said hopper in excess of said load requirement for actuating said movable device.

5. In a separating machine, the combination with a separating sieve, a stationary feed hopper adapted to supply a predetermined load of material to said sieve and to contain an amount of material in excess of such requirement, discharge means for discharging separated material from the machine, a return conveyer for returning a portion of the separated material to the feed hopper, a device movable beneath said sieve to vary the amount of separated material passing respectively to said discharge means and said return conveyer, and a device responsive to changes in the height of material in said hopper to actuate said movable device.

6. In a separating machine, the combination with a separating sieve, and a feed hopper, of means for maintaining a quantity of material in said feed hopper sufficient to supply a load of uniform thickness to said sieve, said means comprising a by-pass duct communicating with and adapted to receive material from said hopper, a receptacle arranged to receive material from said by-pass duct and to be moved thereby, a return conveyer for returning a portion of the material separated by said sieve to said feed hopper, and a movable device controlled by said movable receptacle for varying the amount of separated material passed to said return conveyer.

7. In a separating machine, the combination of a sieve, a feed hopper for said sieve, discharge means for discharging separated material from said machine, a conveyer for returning a portion of the separated material to said feed hopper, a by-pass duct through which excess material in said feed hopper is passed around said sieve to said return conveyer, and means actuated by the material passed through said by-pass duct for controlling the amount of separated material passing respectively to said discharge means and said return conveyer.

8. In a separating machine, the combination of a sieve, a feed hopper for said sieve, discharge means for discharging separated material from said machine, a conveyer for returning a portion of the separated material to said feed hopper, a by-pass duct through which excess material in said feed hopper is passed around said sieve to said return conveyer, and a movable governor receptacle adapted to receive material from said by-pass duct for controlling the amount of separated material passing respectively to said discharge means and said return conveyer.

9. In a separating machine, the combination of a sieve, a feed hopper for said sieve, discharge means for discharging separated material from said machine, a conveyer for returning a portion of the separated material to said feed hopper, a by-pass duct through which excess material in said feed hopper is passed around said sieve to said return conveyer, a movable governor receptacle adapted to receive material from said by-pass duct for controlling the amount of separated material passing respectively to said discharge means and said return conveyer, and means for regulating the discharge of material from said governor receptacle.

10. In a separating machine, the combination of separating mechanism, a feed hopper therefor, means for returning a part of the separated material to the feed hopper, means for discharging excess material from said feed hopper, a movable receptacle which receives said discharging excess material from the feed hopper and has a discharge opening proportioned to cause said excess material to accumulate in said receptacle whereby the receptacle is moved by the weight of the material therein, and mechanism actuated by said receptacle to regulate the amount of separated material passing into said return means.

11. In a separating machine, the combination of a sieve, a feed hopper for the sieve, discharge means for discharging separated material from the machine, a conveyer for returning a portion of the separated material to the feed hopper, a device which is movable to regulate the amount of separated material passing into said return conveyer from said sieve, a conduit for discharging excess material from said feed hopper, a vertically movable receptacle communicating with said conduit, said receptacle having a restricted discharge opening whereby material passing through said conduit will accumulate in said receptacle and force said receptacle downwardly, a shaft, connections between said receptacle and said shaft whereby movement of said receptacle will turn said shaft, a counterweight connected to said shaft and normally tending to maintain said receptacle in its upper position, and connections between said shaft and said movable device whereby the operation of said shaft by said receptacle and counterweight will actuate said movable device.

12. In a separating machine the combination of a sieve, a feed hopper for said sieve, discharge means for discharging separated material from said machine, a return conveyer for returning a portion of the separated material passing through said sieve to said feed hopper, a cut-off device movable beneath said sieve to regulate the amount of separated material passing into said return conveyer from said sieve, a tube extending outwardly from the interior of said feed hopper for discharging excess material from said hopper, a movable governor arranged to receive material discharging from said excess discharge tube, and mechanism actuated by said governor and connected to said movable cut-off whereby movement of said governor will move said cut-off to vary the amount of material permitted to pass into said return conveyer.

13. The herein described method of subjecting material to a separation on a sieve in a layer of uniform thickness, which consists in automatically returning material which has been subjected to separation to the feed for the sieve in such quantity as to maintain a uniform load or feed for the sieve and removing the excess of material in the feed which is not required for maintaining such uniform load or feed from the feed and utilizing such excess to regulate the quantity of material so returned.

14. The herein described method of subjecting material to a combined sifting and air separation, which consists in returning material which has been subjected to the separation and adding such return material to the feed automatically in such quantity as to maintain a uniform load or feed for the sieve and removing the excess of material in the feed which is not required for maintaining such uniform load or feed from the feed, for the purpose of regulating the quantity of returned material required to maintain such uniform load or feed for the sieve.

15. The herein described method of purifying middlings and similar grain products, by a combined sifting and air separation in a layer or load or uniform thickness, which consists in returning to the feed the separated imperfectly purified middlings which are required to be further purified and also returning purified middlings, and adding such returned purified middlings to the feed automatically in such quantity as to maintain a uniform load or feed for the sieve and diverting the excess of returned middlings from the feed and utilizing such excess for regulating the quantity of returned material required to maintain such uniform load or feed.

16. In a separating machine, the combination of a sieve, a feed hopper for said sieve adapted to contain a quantity of material in excess of a uniform load for said sieve, means for returning a portion of the separated material to said feed hopper after it has passed through said sieve, means for diverting excess material in said feed hopper from passage over said sieve, and means controlled by the quantity of material so diverted for regulating said material returning means to return more or less of the separated material to said feed hopper.

Witness my hand this 24th day of February, 1921.

LIDA JEWELL,
*Executrix of the last will and testament of Herbert S. Jewell, deceased.*